United States Patent [19]

Shelnutt

[11] Patent Number: 4,568,435

[45] Date of Patent: Feb. 4, 1986

[54] METHOD FOR IMPROVING PRODUCT YIELDS IN AN ANIONIC METALLOPORPHYRIN-BASED ARTIFICIAL PHOTOSYNTHESIS SYSTEM

[75] Inventor: John A. Shelnutt, Albuquerque, N. Mex.

[73] Assignee: The United States of America as represented by the United States Department of Energy, Washington, D.C.

[21] Appl. No.: 676,046

[22] Filed: Nov. 29, 1984

[51] Int. Cl.$^4$ .............................................. B01J 19/12
[52] U.S. Cl. ................................................ 204/157.52
[58] Field of Search .................. 204/157.1 R, 157.1 W

[56] References Cited

U.S. PATENT DOCUMENTS

| | | | |
|---|---|---|---|
| 4,211,621 | 7/1980 | Porter | 204/157.1 R |
| 4,325,793 | 4/1982 | Kish | 204/157.1 R |
| 4,338,291 | 7/1982 | Yamada et al. | 423/648 R |
| 4,382,846 | 5/1983 | Gratzel | 204/157.1 R |

FOREIGN PATENT DOCUMENTS 0002202 1/1983 Japan ............................ 204/157.1 R

OTHER PUBLICATIONS

Fuhrhop et al., Liebig's Ann. Chem., 1983, 204–210.

Primary Examiner—Howard S. Williams
Attorney, Agent, or Firm—Armand McMillan; Albert Sopp; Judson R. Hightower

[57] ABSTRACT

A method for improving product yields in an anionic metalloporphyrin-based artificial photosynthesis system for hydrogen generation which comprises forming an aqueous solution comprising an electron donor, methylviologen, and certain metalloporphyrins and metallochlorins, and irradiating said aqueous solution with light in the presence of a catalyst. In the photosynthesis process, solar energy is collected and stored in the form of a gas hydrogen. Ligands attached above and below the metalloporphyrin and metallochlorin plane are capable of sterically blocking photochemically inactive electrostatically bound $\pi-\pi$ complexes which can develop.

25 Claims, 1 Drawing Figure

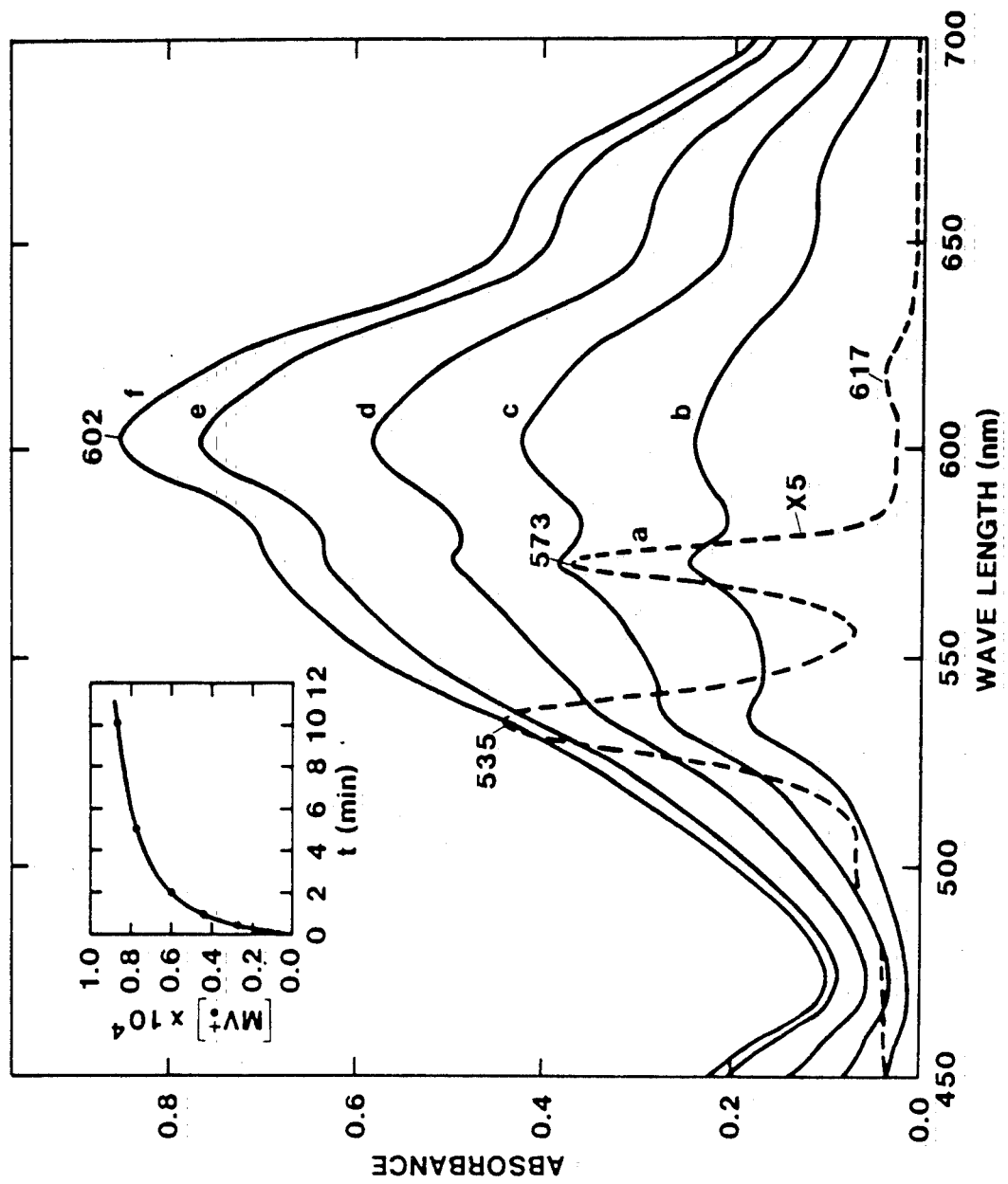

METHOD FOR IMPROVING PRODUCT YIELDS IN AN ANIONIC METALLOPORPHYRIN-BASED ARTIFICIAL PHOTOSYNTHESIS SYSTEM

FIELD OF THE INVENTION

This invention relates to a chemical photosynthesis process wherein hydrogen is released and more particularly to a sterically-blocked metalloporphyrin-based artificial photosynthesis system for hydrogen production.

BACKGROUND OF THE INVENTION

Metalloporphyrins are photosensitizers of methylviologen ($MV^{2+}$) reduction. The reduced methylviologen reduces water to hydrogen gas in the presence of a colloidal platinum catalyst. A system which is composed of a metalloporphyrin, the oxidized methylviologen, the platinum catalyst, and a sacrificial electron donor provides a method of collecting solar energy and storing that energy as a gaseous fuel.

Previously, metalloporphyrins with positively charged substituents at the periphery of the porphyrin ring have been found to be effective in photosensitizing the methylviologen reduction. Quantum yields as high as 0.75 are possible with the most positively charged porphyrins. However, the efficiency of the photoreduction of methylviologen decreases as the number of negatively charged groups on the ring increases.

Japanese Published Application (JP No. 100496) discloses the use of a metal porphyrin in the light-induced production of hydrogen. The metal porphyrin, which is in solution with an electron donor (e.g., EDTA), and a platinum metal catalyst, is subjected to light waves which ultimately produce hydrogen.

U.S. Pat. No. 4,325,793 to Kisch discloses a method for splitting water with light to produce hydrogen by use of a special catalyst.

U.S. Pat. No. 4,382,846 to Gratzel et al and U.S. Pat. No. 4,211,621 to Porter teach the general reaction employed in the light-induced production of hydrogen using a photosensitizer.

Fuhrhop et al, Liebigs Ann. Chem., 1983, 204–210 disclose that reduced methylviologen can be formed by photochemical reduction in the presence of EDTA with water-soluble metalloporphyrins of different oxidation potentials, namely zinc and tin(IV) complexes. Hydrogen is produced in the presence of a collodial platinum catalyst.

SUMMARY OF THE INVENTION

An object of the present invention is to provide a more efficient and longer lived chemical system for the storage of solar energy.

Specifically, another object of the present invention is to improve product yield in a metalloporphyrin-based artificial photosynthesis system for hydrogen generation.

Another object of the present invention is to provide metalloporphyrins with novel solution properties.

The important reactions occurring in the system of the present invention are the following:

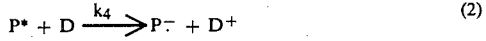

wherein P is an anionic porphyrin with negatively charged peripheral substituents and also containing axial ligands perpendicular to the plane of metalloporphyrin; P* is an excited state of P; $MV^{2+}$ is methylviologen; $MV^{+}$ is the reduced form of methylviologen; and D is a sacrificial electron donor used to reduce P* to $P^-$. $P^-$ reacts with $MV^{2+}$ and the reduced $MV^{2+}$, or $MV^{+}$, can then be used to reduce water using another catalyst (colloidal Pt, hydrogenase, Ni(phthalocyanine) as a powder or supported on alumina, silica, or a zeolite). These reactions occur simultaneously as shown in the following diagram:

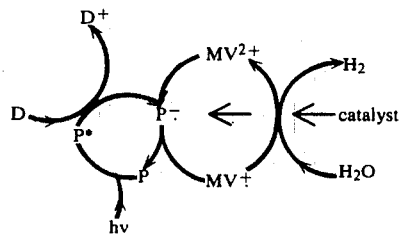

The metalloporphyrin, sacrificial electron donor, and methylviologen are dissolved in water and irradiated with light. Among the electron donors are ethylenediaminetetraacetic acid (EDTA), triethanolamine (TEA), and mercaptoethanol. The pH of the solution typically ranges from 4 to 14, the best results occurring from below pH 8 where $MV^{+}$ can reduce $H_2O$. Although $MV^{2+}$ reduction occurs over the pH range 4–14 for the metalloporphyrins, $MV^{+}$ has sufficient potential to reduce $H_2O$ to $H_2$ only below pH 8. The light has a wavelength of >380 nm. The temperature range is usually 23° C. to 35° C.

The concentration of the porphyrin in the aqueous solution typically ranges from $1\times10^{-8}M$ to $1\times10^{-3}M$; the higher concentrations provide better collection of solar radiation. The methylviologen concentration generally ranges from $1\times10^{-3}M$ to 0.1M, preferably at least a 100 fold excess over the porphyrin concentration. The concentration of the sacrificial electron donor is 0.27M for EDTA, but can range from $10^{-3}M$ to 1M for TEA.

Complexes of anionic metalloporphyrins with $MV^{2+}$ are dominated by the electrostatic attraction between positive and negative charge centers on methylviologen and porphyrin, respectively, although charge-transfer and hydrophobic forces also play a role. The complexes are very stable with equilibrium constants approaching $10^6$. The structure of the complex has the molecules in a coplanar arrangement because attraction between charges at opposite ends of the $MV^{2+}$ molecule and at opposite edges of the porphyrin effectively "clamp" the pyridinium rings of $MV^{2+}$ across the $\pi$-electron system of the porphyrin.

The tight association between MV²⁺ and the metallouroporphyrins leads to a photochemically inactive complex for most metals, e.g., Mg, Zn, Cu, Ni, Pd, Pt, Ag, Fe$^{III}$, H₂, and V=O. That is, no photosensitized reduction of MV²⁺ occurs upon irradiation. The effect on the photophysical and photochemical properties is demonstrated by the complete quenching of fluorescense and phosphorescence of the metalloporphyrin. Prevention of these tight, electrostatically clamped π—π complexes seems to be essential for charge separation in anionic metalloporphyrin-based systems for fuel generation.

For metals with strongly bound axial ligands the normal π—π complexation is disrupted. The degree of binding is determined from the changes in the absorption spectrum.

The present invention utilizes negatively charged metalloporphyrins and metallochlorins of the following formula:

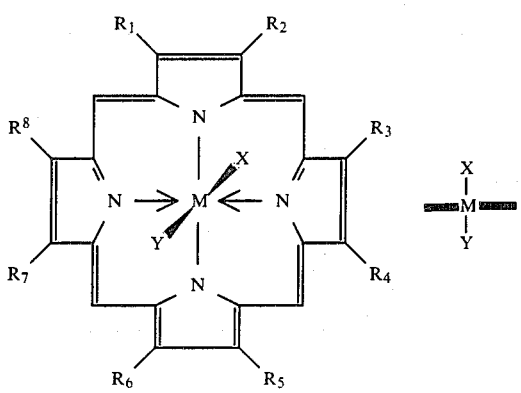

wherein at least four of the R₁, R₂, R₃, R₄, R₅, R₆, R₇ and R₈ groups are acetic acid, propionic acid or vinyl groups and the remaining R₁, R₂, R₃, R₄, R₅, R₆, R₇ and R₈ groups are acetic acid, propionic acid or methyl groups; M is a metal selected from the group consisting of tin, and antimony; X is a hydroxyl or oxo (=O) group; Y is a hydroxyl group; and two solid lines represents a double bond. The porphyrins are active as sensitizers to achieve the photocatalytic reduction of MV²⁺. In the presence of a suitable catalyst, MV⁺ reduces water to H₂ at the expense of a sacrificial electron donor.

Several complexes develop which can render the MV²⁺ photochemically inactive. Inactivation MV²⁺ reduction in the case of anionic porphyrins is associated with formation of an electrostatically bound π—π complex between the metalloporphyrin and the positively charged receptor MV²⁺. The present invention demonstrates that suitable ligands (X and Y) of the central metal atom above and below the porphyrin plane block the formation of the inactive complex and thereby render photochemically active the anionic metalloporphyrins that possess appropriate redox potentials. The tight complexes that the present invention blocks are P—MV²⁺, P*—MV²⁺, P⁻—MV²⁺, and P—P (aggregation of the porphyrins). All of these complexes are photochemically inactive and thus the reaction proceeds only by weak encounter complexes.

With metalloporphyrins that have their water solubility conferred by positively charged substituents on the macrocycle, electrostatic repulsion of MV²⁺ prevents close approach and π—π complex formation; electron transfer is slow, but the repulsive interaction in the encounter complex allows reduced acceptor (MV ) to diffuse away before the back reaction can occur.

On the other hand for negatively charged substituents, strong electrostatic attraction of the viologen dication results in a tight ground-state complex with the metalloporphyrin. Efficient electron transfer occurs in the complex, but rapid back reaction prevents charge separation and significant production of reduced viologen.

If the ground state complex is formed, via

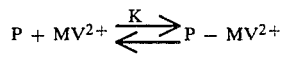

when light is absorbed by P as in equation (1), then $k_{-1} >> k_1$. Therefore, the complex of P—MV²⁺ must be avoided, i.e., K must be small.

The uroporphyrins in alkaline aqueous solutions are an extreme example of a tight ground-state complex with the metalloporphyrin. With eight negatively charged carboxylate groups on the porphyrin ring, MV²⁺ forms a very tight (log K≈6) ground-state complex. The complex has pyridinium ring of MV²⁺ flat against and in π—π interaction with the porphyrin π system.

Normally, for anionic porphyrins K is large due to strong ionic attraction between charges on MV²⁺ and charged groups at the periphery of the porphyrin ring. Addition of blocking ligands to the metal prevents short range attractive interactions (hydrophobic, charge-transfer, etc.), and greatly reduces K. Aggregates (P—P) are also inactive. Metal ligands further block the formation of aggregates

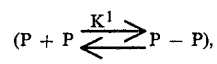

keeping the system active at high concentrations of P where aggregation is favored.

Some of the advantages of sterically blocked metalloporphyrins arise from the prevention of aggregation. These are (1) blocked anionic metalloporphyrins can be used at acid pH where reduction of water to H₂ is thermodynamically more feasible; (2) high concentrations of photosensitizer can be used to absorb much of the solar spectrum in thin, small volume cells; (3) the stability of the photosensitizer is increased; (4) inexpensive metalloporphyrins that normally would aggregate, e.g., M(ProtoP), may be used.

Compounds which are active are the following:

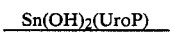

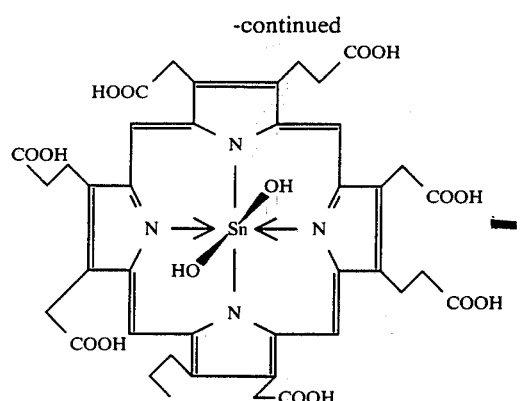

Sb(O)OH(UroP)

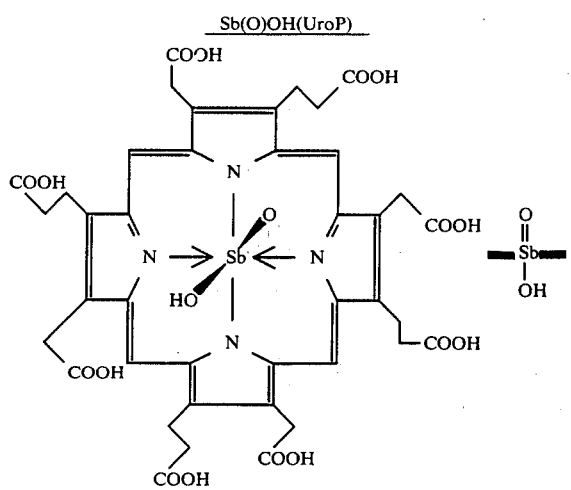

Above pH 5 some or all of the H's of the COOH group are removed so that the porphyrin is surrounded by negatively charged COO− groups. Both molecules possess metal ligands above and below the porphyrin plane and are active. Porphyrins with one or no ligands are inactive.

Cu(UroP)

no axial ligands

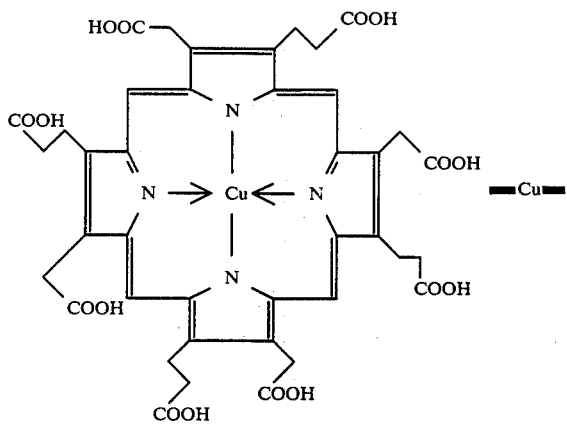

or

V(O)(UroP)

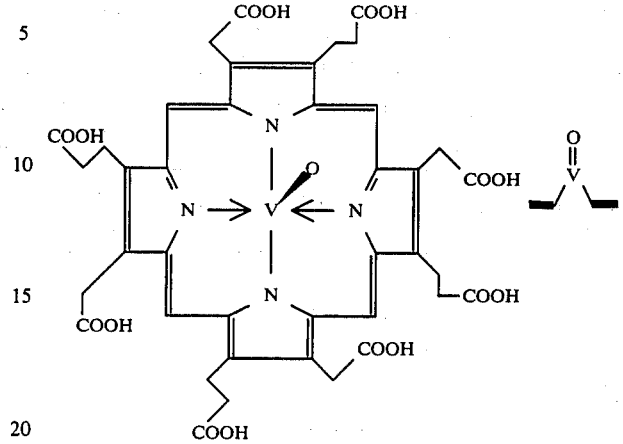

1 axial ligand

Platinum unoporphyrin is a 4-coordinate metallouroporphyrin (no axial ligands). LogK's for binding of the first and second molecules of $MV^{2+}$ are almost equal and near 5.6. The Pt(UroP) data is typical of other 4-coordinate M(UroP) binding data. Presumably one $MV^{2+}$ molecule binds to the top surface and one binds to the bottom surface of the porphyrin ring.

The vanadyl uroporphyrin illustrates the effect of a 5th ligand (1 axial ligand). The binding curve for VO(UroP) is adquately fit by only 1:1 binding indicating that the oxo ligand inhibits binding of the second $MV^{2+}$. The low binding constant and anomalously large spectral changes are explained by the transition from a 6-coordinate dihydroxy vanadium complex to a 5-coordinate V=O complex that is induced by binding one $MV^{2+}$. $Fe(OH)(UroP)$ is 5-coordinate in the absence of $MV^{2+}$, is fit by a 1:1 binding analysis, and has a binding constant near that for 4-coordinate M(UroP)'s.

For $Sn(OH)_2(UroP)$, the two hydroxides cannot be replaced by $MV^{2+}$ and a weak, spectroscopically distinct complex results which is pH dependent. Weaker binding at low pH results from weakened electrostatic attraction as carboxylates of uroporphyrin are successively neutralized by bound protons. Similar blocking of the tight $MV^{2+}$ complex has been observed only for other 6-coordinate M(UroP)'s such as $Fe^{III}(CN)_2$, $Fe^{III}(H_2O)_2$, $Ir^{III}(CO)(OH)$, and $Sb^{IV}(O)(OH)$ uroporphyrins. The $Sn(OH)_2$ and $Sb^{IV}(O)(OH)$ uroporphyrins photoreduce $MV^{2+}$ because only they possess appropriate redox potentials.

Spectral changes are found to be similar regardless of the metal incorporated into the ring unless there is an associated change in axial ligation or the π—π complex does not occur. For example, the π—π complex gives ∼7-nm shifts in the Soret band near 400 nm, whereas for the weak complex the shift is only about 1 nm. When axial ligand changes result from $MV^{2+}$ binding as for VO(UroP), quite large shifts in the π→π* absorption bands are observed (21 nm for the Soret band).

The chlorins $Sn(OH)_2(UroP)$ and $Sb(OH)_2(UroP)$ are also active.

Sn(OH)₂(UroC) and Sb(O)(OH)(UroC):

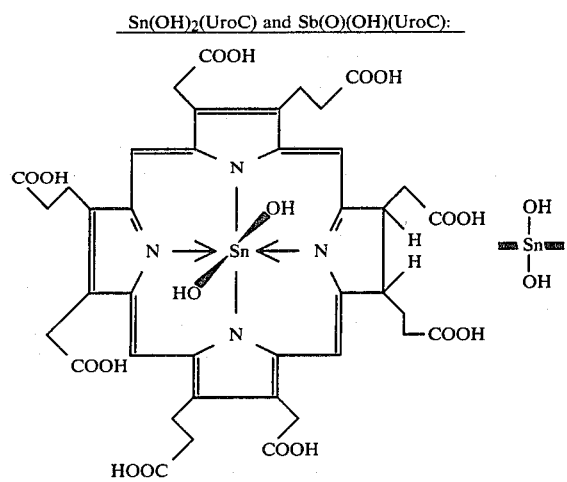

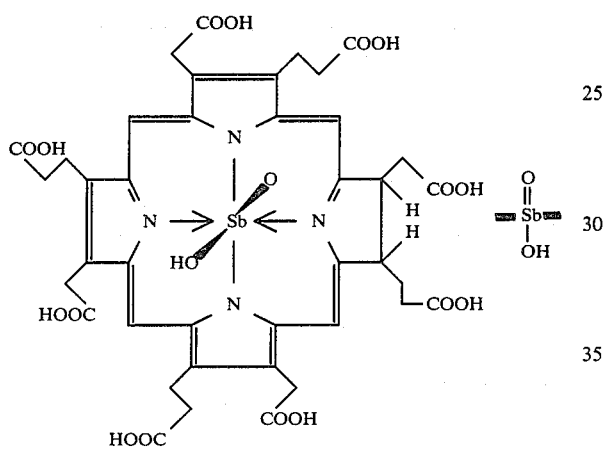

This is advantageous for solar energy application because the red absorption band is shifted from 574 nm to 617 nm where solar radiation is more intense.

Uroporphyrin I:

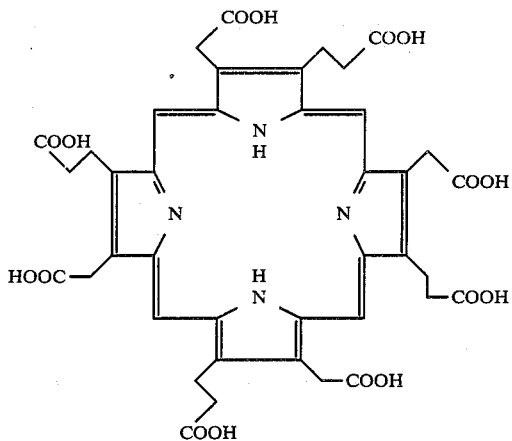

and

Uroporphyrin III, which have no central metal atom, are inactive:

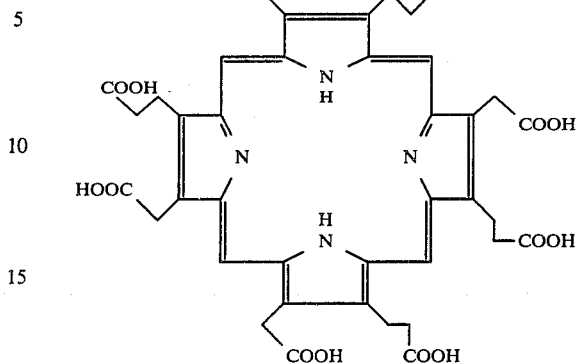

Other active compounds are the metalloprotoporphyrins and metallocoproporphyrins of the following formula:

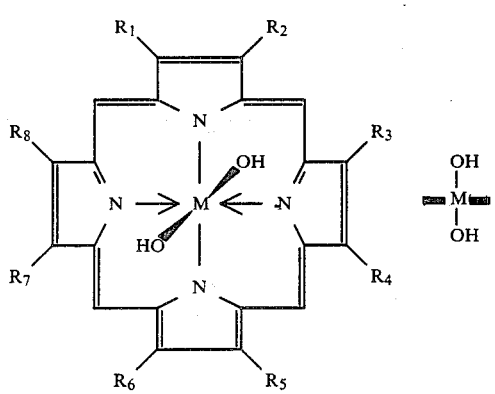

wherein $R_1$, $R_2$, $R_3$, $R_4$, $R_5$, $R_6$, $R_7$ and $R_8$ are each selected from the group consisting of methyl, propionic acid, or vinyl groups; and M is either tin or antimony.

Specifically, metalloprotoporphyrin 1X, represented by the formula:

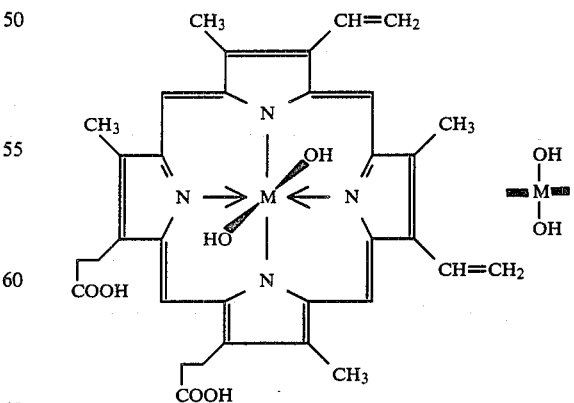

and metallocoporporphyrin I, represented by the formula:

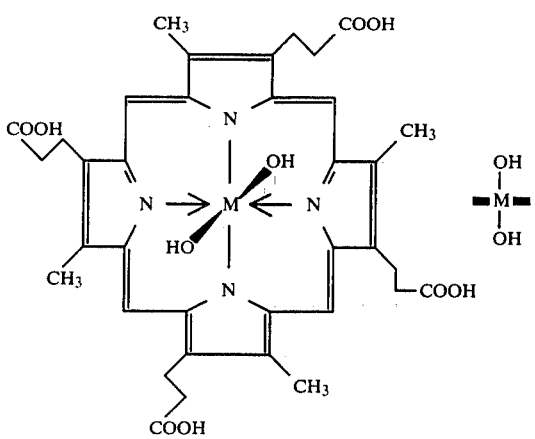

are active.

Metallotetrasulphonatophenylporphyrins, are also active:

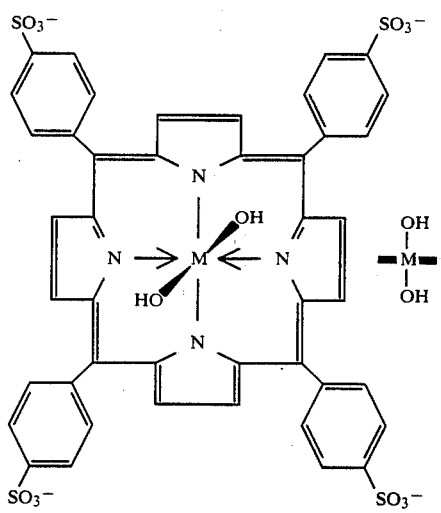

wherein M is either tin or antimony.

Some of the porphyrins, namely the metallo-protoporphyrins and -coproporphyrins, are active only because the axial ligands of the metals used prevent aggregation in the useful concentration range above $10^{-8}$M.

BRIEF DESCRIPTION OF THE DRAWING

The FIGURE of the drawing shows the results of irradiation of a solution containing ethylenediaminetetraacetic acid as an electron donor, $MV^{2+}$ and $Sn(OH_2)UroP$.

DETAILED DESCRIPTION

Example 1

An aqueous solution containing ethylenediaminetetraacetic acid (EDTA) (0.2M), $Sn(OH)_2UroP$ ($2.4\times10^{-5}$M) and $MV^{2+}$ (0.011M) at pH 9 was irradiated with white light from a 25 watt tungsten (Tensor) lamp using an ultraviolet (UV) sharp-cut filter (Corning, C53-75) to eliminate UV light below 380 nm. Dichlorotin(IV)uroporphyrin I was purchased from Porphyrin Products and further purified and converted to the dihydroxy complex by chromatography on G-50-40 Sephadex column. Gel chromatography is not necessary for the photosynthesis system to work, but was carried out to obtain pure samples for spectroscopic studies. Upon dissolving the dichlorotinporphyrin in $H_2O$, the two chloride ligands are moved and replaced by two hydroxides, which form better ligands for tin (IV). When the samples are purified by chromatography, this naturally occurs. Upon irradiation of this system a rapid buildup of $MV^{\ddagger}$ is detected by its broad adsorption with maximum near 602 nm ($E_{602}=1.0\times10^4 M^{-1} cm^{-1}$) as illustrated in the FIGURE.

The quantum yield $\phi$ for production of $MV^{\ddagger}$ was measured with a band-pass filter (Oriel S-60) (524–565 nm) and a 200-W quartz-iodide lamp source and power meter (Spectra Physics, Model 404). A solution containing EDTA (0.2M), $Sn(OH)_2UroP$ ($2.4\times10^{-5}$M), and $MV^{2+}$ (0.011M) at pH 9 gave a quantum yield of $0.42\pm0.1$. This value is at least an order of magnitude higher than for other anionic porphyrins for which complexation is not blocked and is similar to high quantum yields found for cationic porphyrins such as zinc tetrakis(N-methylpyridyl)porphyrin (ZnTMPyP) for which $\phi=0.75$.

As shown in the inset in the FIGURE, $MV^{\ddagger}$ reaches a steady-state concentration of about $0.9\times10^{-4}$M. This is close to the steady-state concentration of $1\times10^{-4}$M measured by McLendon and Miller for ZnTMPyP under similar conditions. The saturation effect is partly due to screening by the strong absorption of $MV^{\ddagger}$ in the region of the metalloporphyrin absorption bands. The quantum yields quoted are calculated from the maximum rate of $MV^{\ddagger}$ generation at early times before screening is significant.

The quantum yield is a strong function of solution conditions. For example, the $MV^{\ddagger}$ concentration at saturation ranges from $2.5\times10^{-6}$M at pH 3.2 to $3.5\times10^{-4}$M at pH 13.1. Therefore, the quantum yield of 0.42 at pH 9 is clearly not obtained at optimum pH. For the donor triethanolamine (0.01M) at pH 10.2, the concentration of $MV^{\ddagger}$ reached under steady-state conditions is about 50% higher than with EDTA at the same pH and 0.3M. No photodecomposition of the porphyrin is observed with TEA, whereas some porphyrin decomposition is noted at EDTA concentrations below 0.2M and at acid pH.

The high activity of the tin uroporphyrin system when compared with other anionic metalloporphyrins can be understood in terms of the electrostatic and steric interactions of the porphyrin and acceptor. Strong axial ligation of hydroxides blocks formation of the tight $\pi$—$\pi$ complex usually favored by the electrostatic, hydrophobic, and charge-transfer forces. Addition of $MV^{2+}$ to a solution of $Sn(OH)_2UroP$ produces only subtle changes in the absorption spectrum of the porphyrin. These changes are not typical of the $\pi$—$\pi$ complex for which the Soret band shifts and large absorbance changes in the Soret and visible bands are noted. Shifts in Raman lines are observed also, and they indicate the porphyrin ring acts as an acceptor in the groundstate complex.

That the axial ligands block $\pi$—$\pi$ complex formation is further supported by the failure of $Sn(OH)_2UroP$ to aggregate under solution conditions for which other uroporphyrins aggregate as evidenced by characteristic changes in their absorption spectra. At room temperature in 0.1M NaOH (pH 14) uroporphyrins are monomeric up to about 0.01M. Upon addition of salt (5M) most metallouroporphyrins dimerize resulting in large spectral changes, especially in the Soret. In contrast, the absorption spectrum of Sn(OH)$_2$UroP is unchanged by addition of NaCl. Neutralization of the carboxylates by protonation at acid pH normally also results in spectral changes characteristic of $\pi$—$\pi$ aggregation, but not in the case of Sn(OH)$_2$UroP.

Another indication that the axial ligands block $\pi$—$\pi$ aggregation is that dihydroxytin coproporphyrin, which has uroporphyrin's four acetates replaced by methyl groups and, hence, has a lower charge ($-4$), does not show a change in its absorption spectrum upon extreme dilution ($8 \times 10^{-8}$M). Other metallocoporphyrins, e.g., Cu, are normally aggregated down to $10^{-6}$M and below this concentration show a characteristic shift in the Soret band upon formation of monomer.

The high activity of anionic Sn(OH)$_2$UroP in photoreduction of MV$^{2+}$ results from (1) prevention of unreactive complexes by the steric constraints provided by the strongly bound axial ligands of tin(IV) and (2) electrostatic interactions of MV$^{2+}$ and charged donor species with the negatively charged porphyrin. At present we cannot distinguish between reductive and oxidative quenching mechanisms for photosensitization, but redox potentials deduced from the dihydroxytin octaethylporphyrin analogue suggest a reductive cycle [Equations (1)-(4)] is operative. Even in the case of a reductive quenching mechanism $\pi$—$\pi$ complexation with MV$^{2+}$ would render the system photochemically inactive. Ag and VO prophyrins also have redox potentials that indicate the possibility of a reductive cycle, but they form strong MV$^{2+}$ complexes and are found to be inactive. Neutral or positively charged electron donors (e.g., TEA) show some advantage over EDTA. The pH dependence of the steady-state concentration probably results from varying the charge at the ring periphery and from successive deprotonations of EDTA. Weak attraction of donors and acceptors coupled with steric blocking of tight, inactive complexes by strongly bound axial ligands may enhance Sn(OH)$_2$UroP activity.

Another anionic metallouroporphyrin, Sb(O)(OH)(UroP), photosensitizes the reduction of viologen with yields comparable to the tin porphyrin. The compound Sb(O)(Cl)(UroP) was synthesized by Porphyrin Products of Logan, Utah. The oxo ligand is attached to the antimony in the salt they used to insert the metal into the porphyrin ring. Fifth and sixth axial ligands are present and prevent aggregation and MV$^{2+}$-complex formation. The antimony porphyrin also has a redox potential similar to that of the tin porphyrin.

Both metalloporphyrins probably work via a reductive cycle. The energy level diagram for the tin and antimony porphyrins gives the estimated levels pertinent to a reductive cycle and an oxidative cycle. Note that charge transfer from the triplet intermediate requires a reductive mechanism. Because no significant quenching of Sn(OH)$_2$(UroP) fluorescence is observed, it appears that the triplet state is the reactive species.

Still another interesting recent result is that a chlorin of Sn(OH)$_2$(UroP) also photo-reduces MV$^{2+}$. The chlorin is a reduction product in which the macrocycle is partially saturated. A chlorin is the main degradation product that results from long term irradiation of the Sn(OH)$_2$(UroP)—EDTA—MV$^{2+}$ system.

The absorption bands of the chlorin are strongly red shifted ($\alpha$ band: 574 nm→617 nm) and this property may be used to enhance collection of solar radiation. Mixing several metalloporphyrins and metallochlorins that absorb in different regions of the solar spectrum would be one way to enhance collection of solar radiation. Use of chlorin instead of porphyrin is biomimetic in the sense that the photosynthetic apparatus also uses a chlorin, chlorophyll, as a solar energy absorber and mixtures of pigments absorbing at different wavelengths to enhance collection of solar radiation. This is the first time that a chlorin has been shown to be active as a photosensitizer of methylviologen reduction.

Example 2

Raman difference spectra demonstrate the great similarity of the MV$^{2+}$ complexes with different metallouroporphyrins. The pattern of shifts in the electronic structure marker lines of the metalloporphyrin is one in which both core-size and oxidation-state marker lines shift about equally by 2-3 cm$^{-1}$ to lower frequency for the complex relative to the uncomplexed metalloporphyrin. It should be noted that the pattern of Raman line shifts for MV$^{2+}$ complexes is distinct from the pattern of shifts that result from complexes with neutral acceptors. The absorption and Raman shifts that occur upon complex formation explicitly determine changes in the frontier molecular orbitals of the macrocycle.

The weak complex formed when two axial ligands are present induces much smaller changes in the absorption spectrum than the $\pi$—$\pi$ complex. In the weak complex MV$^{2+}$ is found only by long-range electrostatic interactions, because the short-range charger-transfer, hydrophobic, and van der Waals interactions are disrupted by the axial ligands.

Aggregation phenomena in the metalloporphyrins of this invention have also been investigated using RDS, uv-visible, and NMR spectroscopy. One of the novel features of the chemistry of the metallouroporphyrins is that they are monomeric at high pH and at concentrations where all other porphyrins are aggregated. The failure to aggregate is a result of the large electrostatic repulsion between the eight carboxylate substituents on each of the monomers. Neutralization and shielding of charge by protonation of carboxylates and by high ionic strength solutions result in aggregation. Therefore, both monomeric and aggregated forms can be examined at concentrations required for most experimental techniques.

Changes in the optical spectra upon aggregation occur. Briefly, a characteristic large blue shift in the Soret absorption occurs upon aggregation whether by acidification or by salt addition. The blue shift is identical to the shift that occurs at very high porphyrin concentration (0.1M) where aggregation of M(UroP)'s does occur. The Raman spectrum also exhibits characteristic shifts in the vibrational frequencies. Oxidation-state and core-size marker lines increase by 1-3 cm$^{-1}$; $\nu_{21}$, a mode sensitive to peripheral substituents and their conformations decreases by about 1 cm$^{-1}$. As for the $\pi$—$\pi$ complex, the metal plays only a minor role in determining spectral shifts if strongly bound axial ligands are not present to block aggregation.

An example of the effect of axial ligands on aggregation is illustrated by VO and Sn(OH)$_2$ porphyrins. At acid pH, 4-coordinate uroporphyrins form large aggregates and precipitate. Five-coordinate VO(UroP), on the other hand, aggregates, but does not precipitate. This result indicates the formation of dimers, while larger aggregates are blocked by the oxo ligand. Sn(OH)$_2$(UroP) is 6-coordinate and does not aggregate at all at low pH or in 5.5M salt solution. Both Sn(OH)$_2$(ProtoP) and Sn(OH)$_2$(CoproP) do not aggregate, whereas the 4- and 5-coordinate metal analogs are aggregated above $10^{-8}$M.

The mechanism of aggregation is demonstrated to depend on neutralization of charge at the periphery of the ring. Salt cations or protons bind to the carboxylates with characteristic affinities in an independent fashion. However, a range of dimerization constants result from differing numbers of bound cations because the electrostatic repulsion varies. The equilibrium expressions that result from such an analysis provide adequate fits to the binding data for a reasonable set of equilibrium constants. For example, a least-squares fit to the degree of binding versus salt concentration curve for Cu(UroP) predicts an equilibrium constant for binding Na+ that is close to the solubility constant for sodium acetate. Protons bind much more readily to acetate and this fact explains why a lower concentration of hydrogen ions are required to cause the corresponding degree of aggregation.

Quite drastic changes occur in the absorption spectra, e.g., ~10-nm shifts in the Soret band, but only small shifts are observed in the Raman electronic structure marker lines.

Example 3

The quantum yield for MV $\overset{+}{\cdot}$ production ($\phi = 2\phi_{H2}$) was studied as a function of time and the results are shown in Table 1:

TABLE 1

| Sample | pH | $\phi$ at time t | | | |
|---|---|---|---|---|---|
| | | 100 sec | 200 sec | 300 sec | 500 sec |
| SnUroP (2.4 × 10⁻⁵ M SnUroP .37 M EDTA) | 9.4 | .28 | .35 | .45 | .33 |
| SnUroP (2.5 × 10⁻⁵ M SnUroP .2 M EDTA) 11 mM MV²⁺ | 9.0 | .27 | .43 | .37 | .32 |

I claim:

1. A method for improving product yield in an anionic metalloporphyrin-based artificial photosynthesis system for hydrogen generation which comprises the steps of:
   forming an aqueous solution comprising an electron donor, methylviologen, and a metalloporphyrin or metallochlorin which is represented by the following formula:

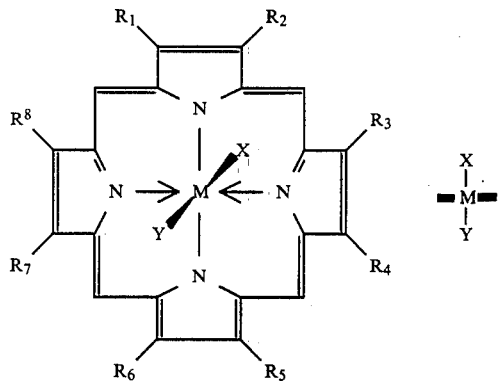

wherein at least four of the $R_1$, $R_2$, $R_3$, $R_4$, $R_5$, $R_6$, $R_7$ and $R_8$ groups are acetic acid, propionic acid, or vinyl groups and the remaining $R_1$, $R_2$, $R_3$, $R_4$, $R_5$, $R_6$, $R_7$, and $R_8$ groups are acetic acid, propionic acid, or methyl groups; M is a metal selected from the group consisting of tin and antimony; X is a hydroxyl or oxo (=O) group; Y is a hydroxyl group; and two solid lines represent double bond; and irradiating said aqueous solution with light in the presence of a catalyst.

2. The method as recited in claim 1, wherein the metalloporphyrin is represented by the formula:

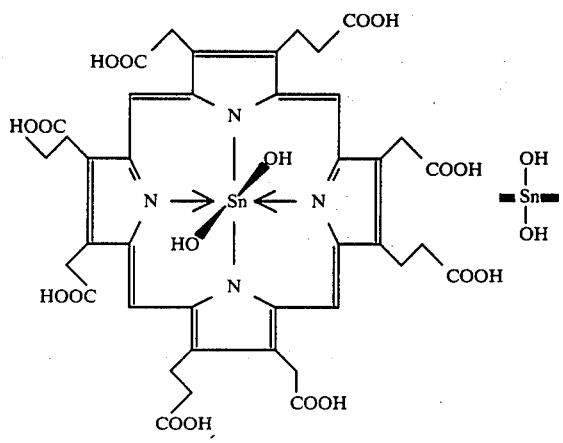

3. The method as recited in claim 1, wherein the metalloporphyrin is represented by the formula:

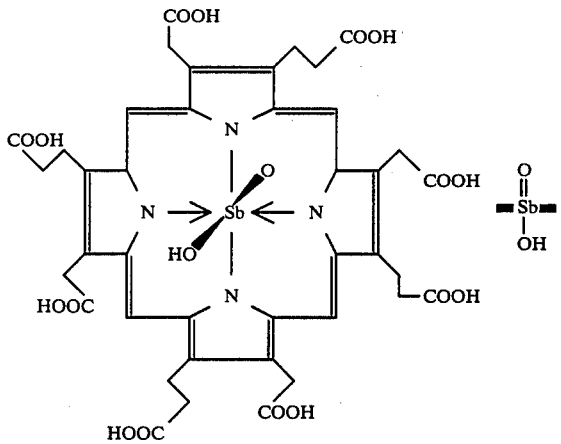

4. The method as recited in claim 1, wherein the metallochlorin is represented by the formula:

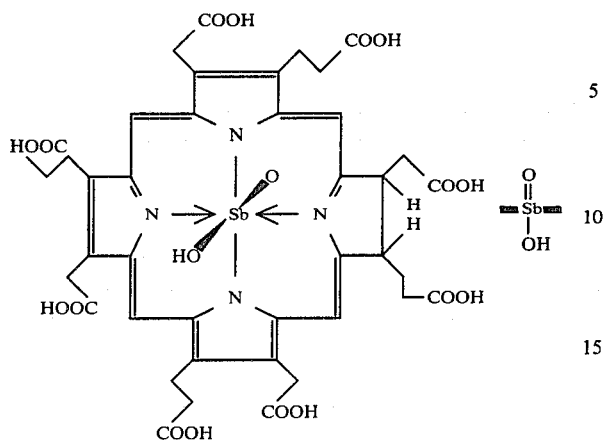

5. The method as recited in claim 1, wherein the metallochlorin is represented by the formula:

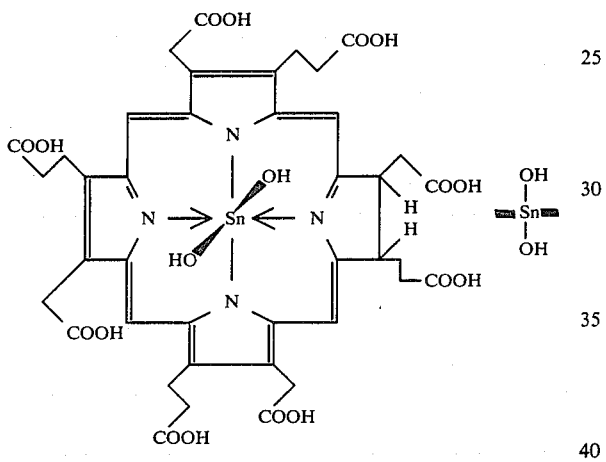

6. The method as recited in claim 1, wherein the pH of the aqueous solution ranges from 4 to 8.

7. The method as recited in claim 1, wherein the light has a wavelength of 300 nm to 700 nm.

8. The method as recited in claim 1, wherein a reaction temperature is from 20° C. to 35° C.

9. The method as recited in claim 1, wherein the sacrificial electron donor is a member selected from the group consisting of: ethylenediaminetetraactic acid, triethanolamine, and mercaptoethanol.

10. The method as recited in claim 1, wherein the concentration of the metalloporphyrin or chlorin ranges from $1 \times 10^{-8}$M to $1 \times 10^{-2}$M.

11. The method as recited in claim 1, wherein the concentration of the sacrificial electron donor ranges from $1 \times 10^{-3}$M to 0.3M.

12. The method as recited in claim 1, wherein the concentration of methylviologen ranges from $1 \times 10^{-4}$ to 1M.

13. The method as recited in claim 1, wherein the catalyst is a member selected from the group consisting of:
   collodial platinum, the enzyme hydrogenase, and nickel phthalocyanine as a powder or supported on alumina, silica, or a zeolite.

14. The method as recited in claim 1, wherein several metallochlorins and metalloporphyrins that absorb in different regions of the solar spectrum are mixed in the aqueous solution.

15. A method for improving product yield in an anionic metalloporphyrin-based artificial photosynthesis system for hydrogen generation which comprises the steps of:
   forming an aqueous system comprising an electron donor, metylviologen, and a metalloporphyrin which is represented by the following formula:

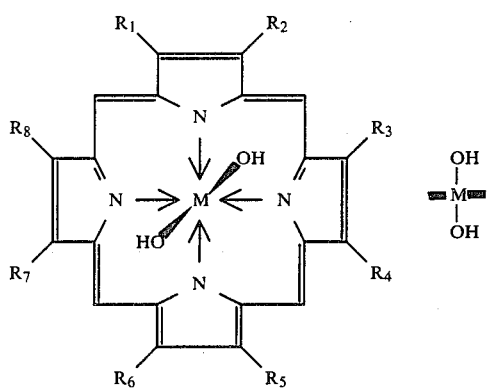

wherein $R_1$, $R_2$, $R_3$, $R_4$, $R_5$, $R_6$, $R^7$, and $R_8$ are each selected from the group consisting of methyl, propionic acid, or vinyl groups; M is either tin or antimony; and irradiating said aqueous solution with light in the presence of a catalyst, wherein at least four of $R_1$, $R_2$, $R_3$, $R_4$, $R_5$, $R_6$, $R_7$ and $R_8$ are propionic acid or vinyl groups.

16. The method as recited in claim 15, wherein the metalloporphyrin is metalloprotoporphyrin, represented by the formula:

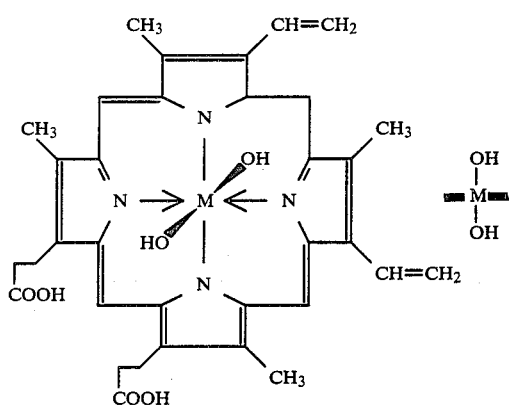

17. The method as recited in claim 15, wherein the metalloporphyrin is metallocoproporphyrin I, represented by the formula:

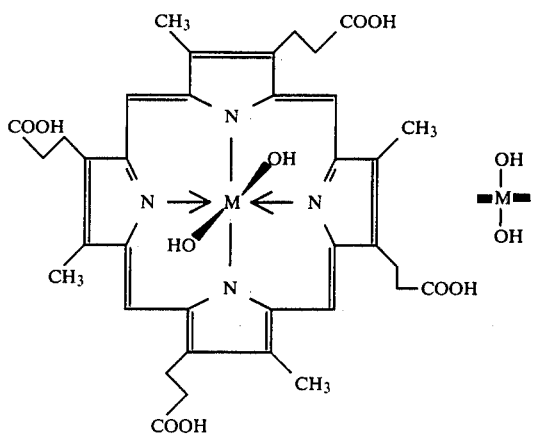

18. The method as recited in claim 15, wherein the pH of the aqueous solution ranges from 4 to 8.

19. The method as recited in claim 15, wherein the light has a wavelength of 300 nm to 700 nm.

20. The method as recited in claim 15, wherein the sacrificial electron donor is a member selected from the group consisting of: ethylenediaminetetraacetic acid, triethanolamine and mercaptoethanol.

21. The method as recited in claim 15, wherein the catalyst is a member selected from the group consisting of:
collodial platinum, the enzyme hydrogenase, and nickel phthalocyanine as a powder or supported on alumina, silica, or a zeolite.

22. The method as recited in claim 15, wherein methylviologen is replaced by a member selected from the group consisting of: heptylviologen, benzylviologen, and zwitterionicviologens.

23. The method as recited in claim 22, wherein methylviologen is replaced by a zwitterionicviologen which is propylviologen sulfonate.

24. The method as recited in claim 15, wherein methylviologen is replaced by a quinone.

25. A method for improving product yield in an anionic metalloporphyrin-based artificial photosynthesis system for hydrogen generation which comprises the steps of:
forming an aqueous solution comprising an electron donor, methylviologen, and a metallotetrasulfonatophenylporphyrin which is represented by the following formula:

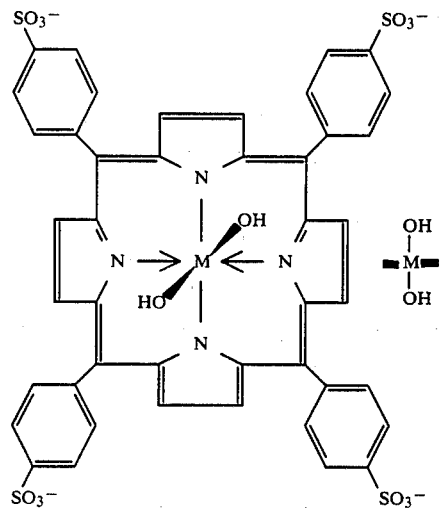

wherein M is either tin or antimony; and
irradiating said aqueous solution with light in the presence of a catalyst.

* * * * *